(12) United States Patent
Gouda et al.

(10) Patent No.: US 9,600,655 B2
(45) Date of Patent: Mar. 21, 2017

(54) POLICY UPDATE SYSTEM AND POLICY UPDATE APPARATUS

(71) Applicants: KABUSHIKI KAISHA TOSHIBA, Minato-ku (JP); TOSHIBA SOLUTIONS CORPORATION, Kawasaki-shi (JP)

(72) Inventors: Kouji Gouda, Fuchu (JP); Minoru Nishizawa, Fuchu (JP); Kenjiro Naemura, Mitaka (JP); Masaya Hirabara, Fuchu (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 0 days.

(21) Appl. No.: 14/669,563

(22) Filed: Mar. 26, 2015

(65) Prior Publication Data
US 2015/0199506 A1    Jul. 16, 2015

Related U.S. Application Data

(63) Continuation of application No. PCT/JP2012/074768, filed on Sep. 26, 2012.

(51) Int. Cl.
*G06F 21/45* (2013.01)
*G06F 21/41* (2013.01)
(Continued)

(52) U.S. Cl.
CPC .............. *G06F 21/45* (2013.01); *G06F 21/31* (2013.01); *G06F 21/33* (2013.01); *G06F 21/41* (2013.01); *G06F 2221/2117* (2013.01)

(58) Field of Classification Search
CPC ........... G06F 21/45; G06F 21/33; G06F 21/41
See application file for complete search history.

(56) References Cited

U.S. PATENT DOCUMENTS 7,606,801 B2    10/2009  Faitelson et al.
8,418,238 B2 *   4/2013  Platt .................... H04L 63/0815
                                            726/1
(Continued)

FOREIGN PATENT DOCUMENTS

CN         1574739 A      2/2005
CN       101288084 A     10/2008
(Continued)

OTHER PUBLICATIONS

Combined Search Report and Examination Report issued on Nov. 24, 2015 in Singapore Patent Application No. 11201502307P.
(Continued)

*Primary Examiner* — Brandon Hoffman
*Assistant Examiner* — Wasika Nipa
(74) *Attorney, Agent, or Firm* — Oblon, McClelland, Maier & Neustadt, L.L.P.

(57) ABSTRACT

According to one embodiment, a policy update system includes a server apparatus configured to be able to provide a plurality of services to a user, the server apparatus including storage device for storing a first user ID; a policy storage device configured to store a plurality of policies, each policy being composed of condition describing user attribute information in which a plurality of items including a second user ID corresponding to the first user ID are associated, and each policy specifying a use privilege of each service; a policy update apparatus configured to be able to update each stored policy; and a user attribute information storage device configured to store post-change user attribute information, and a change content for each second user ID.

6 Claims, 11 Drawing Sheets

(51) Int. Cl.
*G06F 21/31* (2013.01)
*G06F 21/33* (2013.01)

(56) References Cited

U.S. PATENT DOCUMENTS

| | | | |
|---|---|---|---|
| 2004/0034659 A1* | 2/2004 | Steger | G06Q 10/10 |
| 2007/0094199 A1 | 4/2007 | Deshpande et al. | |
| 2007/0244899 A1 | 10/2007 | Faitelson et al. | |
| 2008/0016104 A1 | 1/2008 | Kuehr-McLaren et al. | |
| 2009/0249440 A1 | 10/2009 | Platt et al. | |
| 2010/0153950 A1 | 6/2010 | Govindankutty et al. | |

FOREIGN PATENT DOCUMENTS

| | | | |
|---|---|---|---|
| JP | 2007-323357 A | 12/2007 |
| JP | 2009-129289 A | 6/2009 |
| JP | 2010-176485 A | 8/2010 |
| JP | 4892093 B1 | 12/2011 |
| JP | 2012-94106 A | 5/2012 |

OTHER PUBLICATIONS

International Search Report issued Nov. 6, 2012 for PCT/JP2012/074768 filed on Sep. 26, 2012 with English Translation.
Written Opinion issued Nov. 6, 2012 for PCT/JP2012/074768 filed on Sep. 26, 2012.
Cantor, S., et al., "Assertions Protocol for the OASIS Security Assertion Markup Language (SAML) V2.0," *OASIS Standard*, http://docs.oasis-open.org/security/saml/v2.0/saml-core-2.0-os pdf, Retrieved on Mar. 15, 2015.
Combined Office Action and Search Report issued Sep. 27, 2016 in Chinese Patent Application No. 201280076050.7 (with English language translation).

* cited by examiner

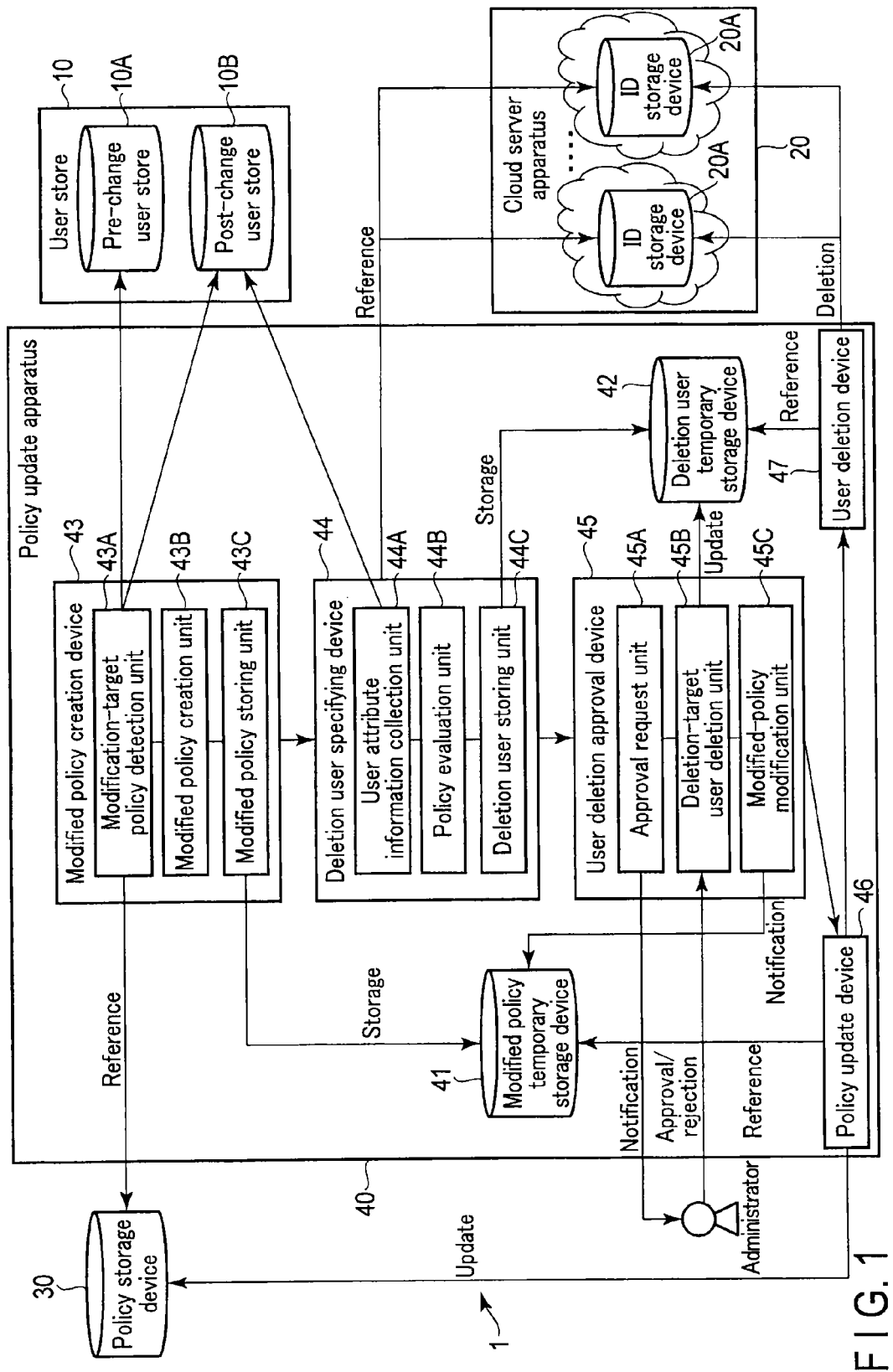
F I G. 1

| Department Id | Department name | Deletion flag |
|---|---|---|
| dept1 | General affairs department | false |
| dept2 | Business department | false |
| dept3 | Research department | false |
| dept4 | Development department | false |

$D_B$

F I G. 3

| Section Id | Section name | Deletion flag |
|---|---|---|
| sect1 | ○○ technical section | false |
| sect2 | ×× technical section | false |
| sect3 | Development support technical section | false |

$S_B$

F I G. 4

| Post Id | Post name | Deletion flag |
|---|---|---|
| post1 | Department manager | false |
| post2 | Section chief | false |
| post3 | Person in charge | false |

$P_B$

F I G. 5

| | SaaSId | SaaS name | Administrator Id |
|---|---|---|---|
| Sa1 | saas001 | SaaS1 | user01 |
| Sa2 | saas002 | SaaS2 | user02 |
| Sa3 | saas003 | SaaS3 | user08 |

$Sa$

F I G. 6

| | User Id | User name | Department Id | Section Id | Post Id | Mail address |
|---|---|---|---|---|---|---|
| UA1 | user01 | username1 | dept3 | — | post1 | username1 @aaa.co.jp |
| UA2 | user02 | username2 | dept3 | sect1 | post2 | username2 @aaa.co.jp |
| UA3 | user03 | username3 | dept3 | sect2 | post3 | username3 @aaa.co.jp |
| UA4 | user04 | username4 | dept3 | sect1 | post3 | username4 @aaa.co.jp |
| UA5 | user05 | username5 | dept3 | sect2 | post2 | username5 @aaa.co.jp |
| UA6 | user06 | username6 | dept3 | sect1 | post3 | username6 @aaa.co.jp |
| UA7 | user07 | username7 | dept3 | sect2 | post3 | username7 @aaa.co.jp |
| UA8 | user08 | username8 | dept5 | sect4 | post1 | username8 @aaa.co.jp |
| UA9 | user09 | username9 | dept5 | sect4 | post2 | username9 @aaa.co.jp |
| UA10 | user10 | username10 | dept5 | sect4 | post3 | username10 @aaa.co.jp |

F I G. 7

| Department Id | Department name | Deletion flag |
|---|---|---|
| dept1 | General affairs department | false |
| dept2 | Business department | false |
| dept3 | Research department | false |
| dept4 | Development department | false |
| dept5 | Development support department | false |

| Section Id | Section name | Deletion flag |
|---|---|---|
| sect1 | ○○ technical section | false |
| sect2 | ×× technical section | false |
| sect3 | Development support technical section | true |
| sect4 | Development support section | false |

|  | User Id | User name |
|---|---|---|
| R1₁ | user01 | username1 |
| R1₂ | user02 | username2 |
| R1₃ | user08 | username8 |

R1

F I G. 10

|  | User Id | User name |
|---|---|---|
| R2₁ | user02 | username2 |
| R2₂ | user03 | username3 |

R2

F I G. 11

|  | User Id | User name |
|---|---|---|
| R3₁ | user08 | username8 |
| R3₂ | user09 | username9 |
| R3₃ | user10 | username10 |

R3

F I G. 12

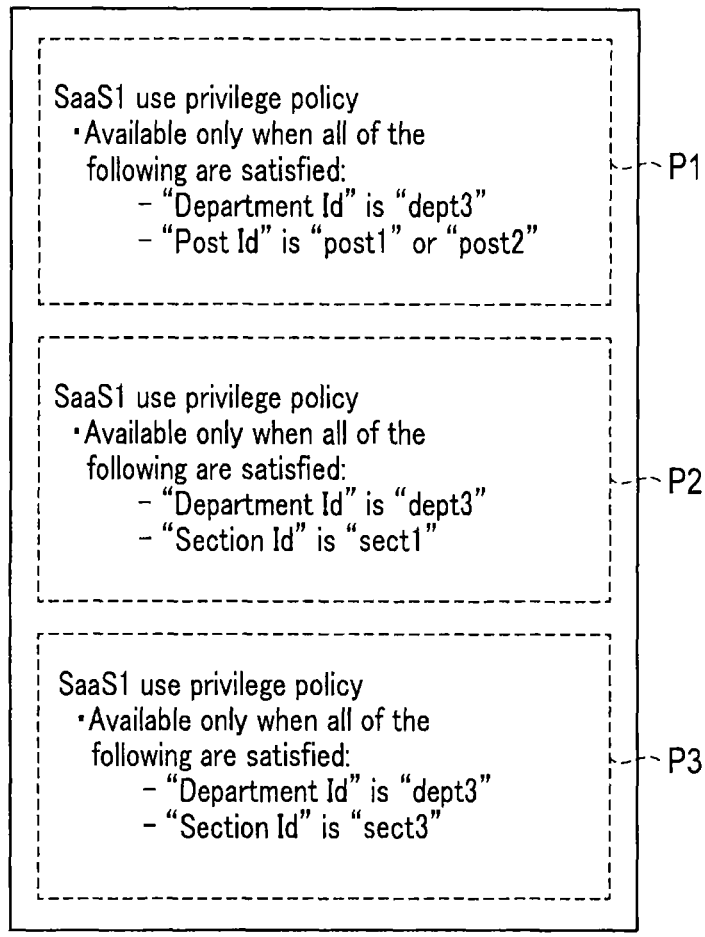
F I G. 13
| User Id | Deletion-target SaaS | | |
|---|---|---|---|
| | SaaS1 | SaaS2 | SaaS3 |
| user03 | − | ○ | − |
| user08 | ○ | − | × |
F I G. 14

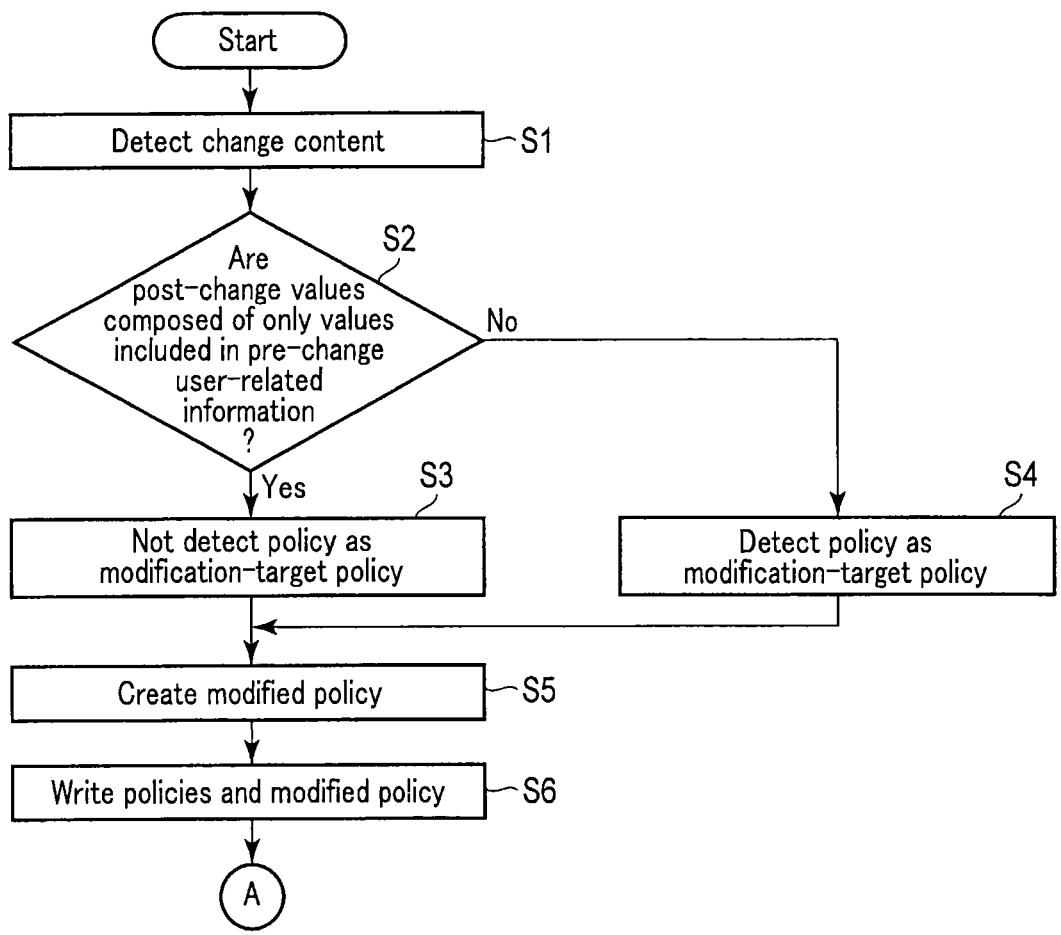
F I G. 15

| User Id | User name | Department Id | Section Id | Post Id | Mail address |
|---|---|---|---|---|---|
| user01 | username1 | dept3 | — | post1 | username1 @aaa.co.jp |
| user02 | username2 | dept3 | sect1 | post2 | username2 @aaa.co.jp |
| user03 | username3 | dept3 | sect2 | post3 | username3 @aaa.co.jp |
| user08 | username8 | dept5 | sect4 | post1 | username8 @aaa.co.jp |
| user09 | username9 | dept5 | sect4 | post3 | username9 @aaa.co.jp |
| user10 | username10 | dept5 | sect4 | post3 | username10 @aaa.co.jp |

F I G. 16

| User Id | User name | SaaS1 use privilege | SaaS2 use privilege | SaaS3 use privilege |
|---|---|---|---|---|
| user01 | username1 | Permission | — | — |
| user02 | username2 | Permission | Permission | — |
| user03 | username3 | — | Refusal | — |
| user08 | username8 | Refusal | — | Permission |
| user09 | username9 | — | — | Permission |
| user10 | username10 | — | — | Permission |
F I G. 17
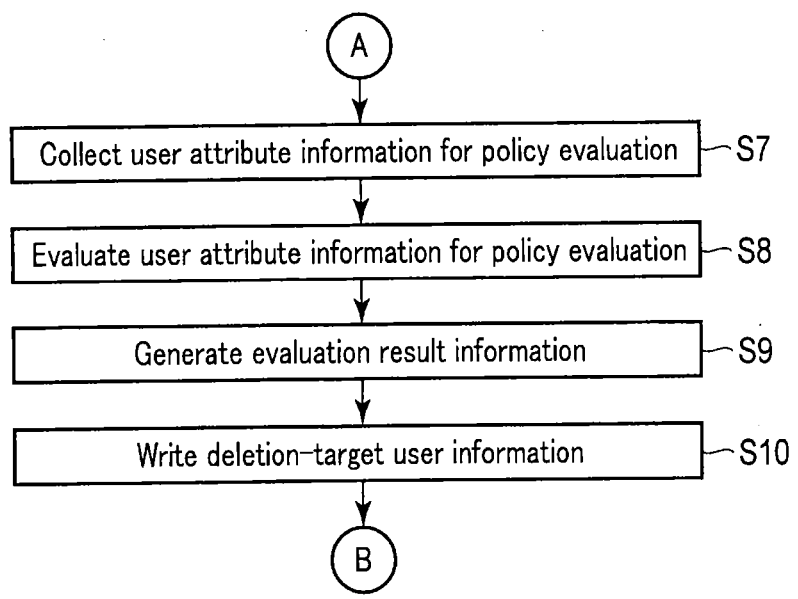
F I G. 18

POLICY UPDATE SYSTEM AND POLICY UPDATE APPARATUS

CROSS REFERENCE TO RELATED APPLICATIONS

This application is a Continuation application of PCT Application No. PCT/JP2012/074768, filed Sep. 26, 2012, the entire contents of which are incorporated herein by reference.

FIELD

Embodiments described herein relate generally to a policy update system and a policy update apparatus.

BACKGROUND

With the background of the situation in which the degree of dependency on online services of the society, economy and living increases, there has been an increasing importance of identity management which manages information relating to individuals and organizations. The identity management is a technique for promoting the security and convenience of the information relating to individuals and organizations in various services and systems, and managing the whole of the life cycle of an identity from registration to a change and deletion.

Here, the identity, in this context, refers to the whole of information which specifies an individual, a group, and an organization/company in a certain situation, and includes an identifier, credentials and attributes. The identifier is information for discriminating the identity, and corresponds to, for instance, an account or an employee number. The credentials are information for indicating the validity of some information content, and are, for instance, a password. The attributes are information which characterizes the identity, and refer to, for instance, a name, an address, and date of birth. As a typical example of the technique utilizing such identity management, there is known Single Sign-On (hereinafter abbreviated as SSO). The SSO is a technique which enables use of a plurality of applications and services by a single authentication procedure. In many cases, the SSO integrates authentications which are provided in a plurality of applications in a single domain such as an intranet of one company. In this case, the SSO is generally realized by a method in which an authentication result is included in an HTTP Cookie and the authentication result is shared between the applications. In addition, such SSO methods have been individually manufactured as access management products by SI (System Integration) vendors or middleware vendors.

In recent years, there has been a demand for an SSO among different domains (hereinafter also referred to as cross-domains) across a single domain. A reason for this is outsourcing due to an acceleration of the consolidation and merger of companies, overseas expansion, and SaaS (Software as a Service) or the like in emerging cloud computing. For example, one of the merits of the SaaS or the like is quick use when needed.

However, when cross-domain SSO is realized, sharing of an authentication result is very time-consuming. There are two main causes. The first cause is that, since the use of HTTP Cookie is limited to a single domain, an authentication result cannot be shared between domains by using the HTTP Cookie. The second cause is that, since SSO methods of access management products, which are adopted for respective domains, are different among vendors, simple introduction is not possible and additional measures need to be prepared.

In order to resolve such causes, there has been an increasing demand for standardization of the SSO. One of typical standardization techniques, which meet such a demand, is SAML (Security Assertion Markup Language) which was formulated by a nonprofit organization, OASIS (Organization for the Advancement of Structured Information Standards).

The SAML is specifications in which the expression form of information relating to authentication, approval and attributes, and transmission/reception procedures are defined, and the SAML is systematically stipulated so as to realize various implementation modes in accordance with purposes. Subjects comprise three parties, i.e. an identity provider (hereinafter, abbreviated as IdP, and referred to as "ID provider"), a service provider (hereinafter, abbreviated as SP, and referred to as "service provider"), and a user. The SSO is realized by the service provider trusting an authentication result which is issued by the ID provider.

When the SSO based on SAML is started, the following two points, in general, need to be prepared in advance. The first point is that the relationship of trust should be established in advance by information exchange and consensus building in business and technical aspects between the service provider and ID provider. The second point is that one user should have individual accounts for respective service providers and should federate these individual SP accounts and the account of the ID provider in advance. The SSO cannot be started unless in a state in which advance preparations, such as the establishment of the relationship of trust and the advance account federation, have been completed.

After these advance preparations, the SSO is realized by the following procedures (1) to (6). Here, the procedures of the SSO through a Web browser are described.

(1) A user requests service provision from a service provider.

(2) Since the service provider has not yet authenticated the user, the service provider sends an authentication request to the ID provider via a user-side Web browser.

(3) The ID provider authenticates the user by some means, and creates an authentication assertion.

Incidentally, the SAML does not stipulate the means for authentication, but stipulates a scheme for informing the service provider of an authentication assertion. The authentication assertion includes information, such as the kind of authentication means and the manner in which the credentials were created, in order for the service provider to determine whether the authentication result is trustworthy or not.

(4) The ID provider returns an authentication result including the created authentication assertion to the service provider via the user-side Web browser.

(5) The service provider determines permission/non-permission of service provision, based on the authentication result of the ID provider.

(6) The user receives service provision from the service provider.

In this manner, in the SSO that is based on SAML, a plurality of services are made usable by the user simply executing a one-time authentication procedure for the ID provider, without executing a further authentication procedure. At present, in order to secure interoperability of cross-domains, the middle vendor, which implemented the individual SSO system, sells access management products in which an SAML ID provider/service provider function is implemented, or introduces a commercial Web service in which an SAML service provider function is implemented.

In the meantime, in the SSO based on SAML, as described above, the advance account federation and registration are necessary. In usual cases, when a company uses a service which is provided by a service provider, an IS (Information System) department performs account registration and federation for the service provider.

The IS department collectively performs a large volume of advance processes corresponding to many users belonging to the company, or conducts, after a procedure through a serial approval flow at an arbitrary timing given by a user, the account registration and federation for this user.

Here, in the former case of executing the advance process, since there is no need to execute account registration and federation in the process of the SSO, there is no relation to the above-described data processing system.

On the other hand, in the latter case of the procedure through the approval flow, a great deal of time and labor is needed since the procedure is conducted through not only the user but also many people, such as superiors in layers of the organizational hierarchy to which the user belongs, and people in a procurement department and an IS department. Furthermore, since the IS department does not collectively perform the advance processes, manual operations occur, which are burdensome and are low in efficiency and convenience. For example, it is not possible to utilize the merit of quick use in SaaS, etc.

Accordingly, in the system which executes account registration and federation in the process of the SSO, it is preferable that the system has a seamless scheme for determining permission/non-permission of service use in a non-manual manner.

Thus, there is a technique for automating a series processes from the application for use of services provided by a service provider to the SSO, by inserting, between the procedures (2) and (3) of the SSO, a process of executing account federation and registration after evaluating permission/non-permission of use of services provided by the service provider, based on a pre-defined policy relating to service use and the condition of service use.

The above-described technique has no problem in usual cases. However, according to the study by the inventor, there is room for improvement, as described below.

Usually, in a company, if a change in organization or personnel is made, user attribute information which is identity information relating to a user is updated. In accordance with this, it is necessary to conduct an update work of the policy and an update work of the system environment. In general, these works are conducted through a manual work (i.e. the user performs a policy update work and a system environment update work).

However, a manual work imposes a heavy load on the user, and there is a concern that a work error (human error) will occur.

BRIEF DESCRIPTION OF THE DRAWINGS

FIG. 1 is a schematic view illustrating a configuration example of a policy update system according to an embodiment.

FIG. 3 is a schematic view illustrating an example of the user-related information which is stored in the user store according to the embodiment.

FIG. 4 is a schematic view illustrating an example of the user-related information which is stored in the user store according to the embodiment.

FIG. 5 is a schematic view illustrating an example of the user-related information which is stored in the user store according to the embodiment.

FIG. 6 is a schematic view illustrating an example of the user-related information which is stored in the user store according to the embodiment.

FIG. 7 is a schematic view illustrating an example of the user-related information which is stored in the user store according to the embodiment.

FIG. 8 is a schematic view illustrating an example of the user-related information which is stored in the user store according to the embodiment.

FIG. 9 is a schematic view illustrating an example of the user-related information which is stored in the user store according to the embodiment.

FIG. 10 is a schematic view illustrating an example of ID registration information which is stored in an ID storage device according to the embodiment.

FIG. 11 is a schematic view illustrating an example of the ID registration information which is stored in the ID storage device according to the embodiment.

FIG. 12 is a schematic view illustrating an example of the ID registration information which is stored in the ID storage device according to the embodiment.

FIG. 13 is a schematic view illustrating an example of policies which are stored in a policy storage device according to the embodiment.

FIG. 14 is a schematic view illustrating an example of deletion-target user information which is stored in a deletion user temporary storage device according to the embodiment.

FIG. 15 is a flowchart illustrating an example of the operation of a modified policy creation device according to the embodiment.

FIG. 16 is a schematic view illustrating an example of user attribute information for policy evaluation according to the embodiment.

FIG. 17 is a schematic view illustrating an example of evaluation result information according to the embodiment.

FIG. 18 is a flowchart illustrating an example of the operation of a deletion user specifying device according to the embodiment.

DETAILED DESCRIPTION

Figure 2:
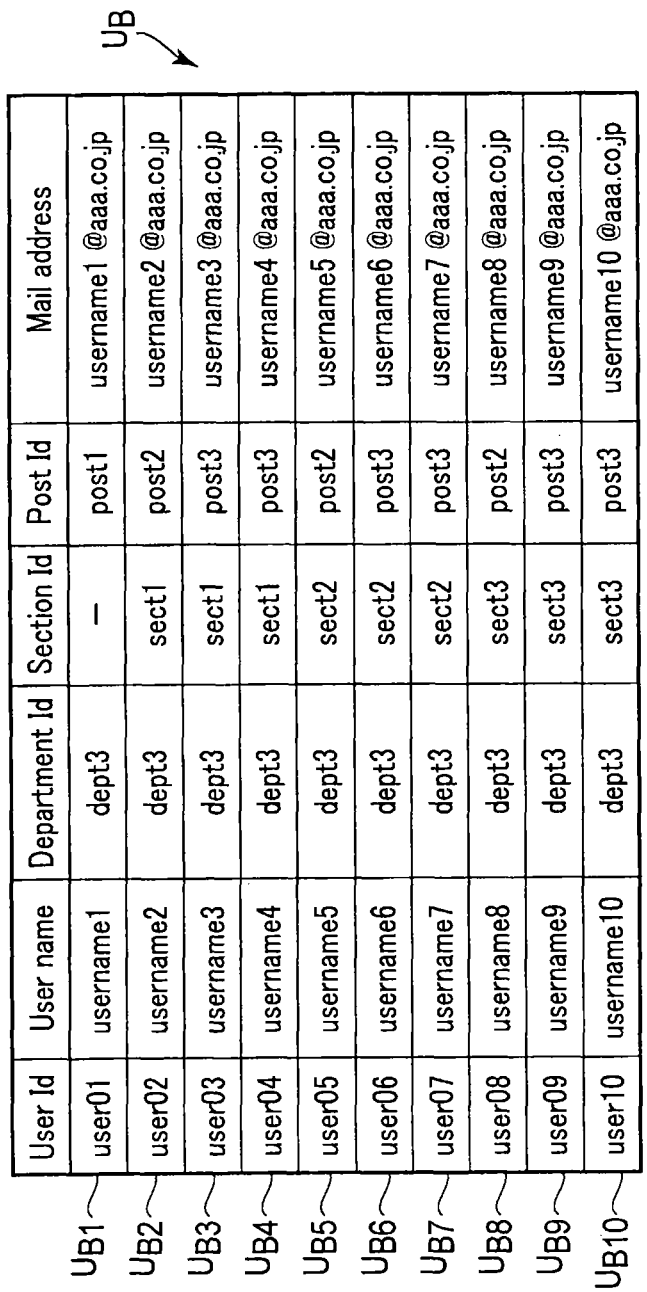
FIG. 2 is a schematic view illustrating an example of user-related information which is stored in a user store according to the embodiment.

Various embodiments will be described hereinafter with reference to the accompanying drawings.

In general, according to one embodiment, a policy update system according to an embodiment includes a server apparatus configured to be able to provide a plurality of services to a user, the server apparatus including storage device for storing, with respect to each of the services, at least a first user ID which identifies a user who can use the services; a policy storage device configured to store a plurality of policies, each policy being composed of at least one condition describing user attribute information which is identity information relating to the user and in which a plurality of items including at least a second user ID corresponding to the first user ID are associated, and each policy specifying a use privilege of each service, which permits use of the services when a value of the user attribute information satisfies the condition; a policy update apparatus configured to be able to update each stored policy when the user attribute information was changed; and a user attribute information storage device configured to store post-change user attribute information, and a change content for each second user ID, the change content indicating values which are different between pre-change user attribute information and the post-change user attribute information, and including a value of the pre-change user attribute information and a value of the post-change user attribute information.

The policy update apparatus includes detection device, creation device, collection device, evaluation device, specifying device, update device, and deletion device.

The detection device detects a modification-target policy which requires modification, among the policies stored in the policy storage device, based on the change content stored in the user attribute information storage device.

The creation device creates a modified policy in which the value of the user attribute information, which is described in the detected modification-target policy, was modified from the value of the pre-change user attribute information in the stored change content to the value of the post-change user attribute information.

The collection device collects the post-change user attribute information including the second user ID of the user, who can use the services provided by the server apparatus, as user attribute information for policy evaluation, from the user attribute information storage device.

The evaluation device evaluates the collected user attribute information for policy evaluation with respect to each second user ID, based on the policies excluding the created modified policy, among the policies stored in the policy storage device, and the created modified policy.

The specifying device specifies the second user ID which is indicative of, among evaluation results by the evaluation device, an evaluation result to an effect that the policy is satisfied by the pre-change user attribute information in the change content stored in the user attribute information storage device but the policy and/or modified policy is not satisfied by the value of the collected user attribute information for policy evaluation.

The update device updates the policy corresponding to the created modified policy, among the policies stored in the policy storage device, to the modified policy.

The deletion device deletes the first user ID, which corresponds to the specified second user ID, from the storage device in the server apparatus.

Figures 19, 20:
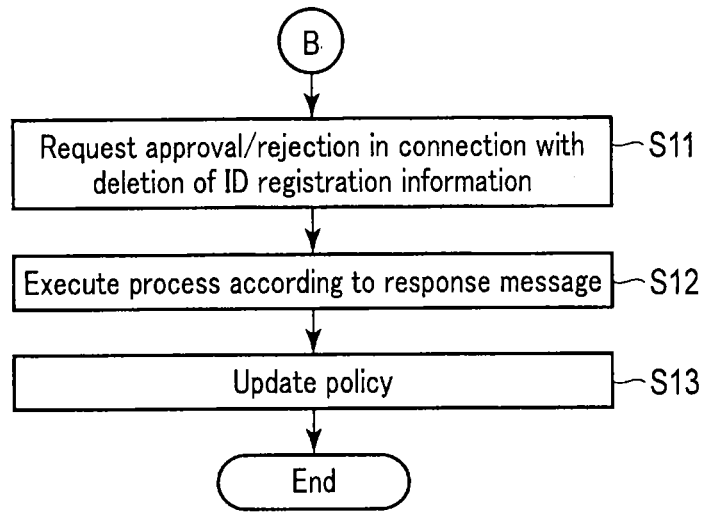
FIG. 19 is a schematic view illustrating an example of the operation of a user deletion approval device according to the embodiment.
FIG. 20 is a schematic view illustrating an example of a modified policy according to the embodiment.

FIG. 1 is a schematic view illustrating a configuration example of a policy update system according to an embodiment. FIG. 2 to FIG. 9 are schematic views illustrating examples of user-related information which is stored in a user store according to the embodiment. FIG. 10 to FIG. 12 are schematic views illustrating examples of ID registration information which is stored in an ID storage device according to the embodiment. FIG. 13 is a schematic view illustrating an example of policies which are stored in a policy storage device according to the embodiment. FIG. 14 is a schematic view illustrating an example of deletion-target user information which is stored in a deletion user temporary storage device according to the embodiment. FIG. 15 is a flowchart illustrating an example of the operation of a modified policy creation device according to the embodiment. FIG. 16 is a schematic view illustrating an example of user attribute information for policy evaluation according to the embodiment. FIG. 17 is a schematic view illustrating an example of evaluation result information according to the embodiment. FIG. 18 is a flowchart illustrating an example of the operation of a deletion user specifying device according to the embodiment. FIG. 19 is a schematic view illustrating an example of the operation of a user deletion approval device according to the embodiment. FIG. 20 is a schematic view illustrating an example of a modified policy according to the embodiment.

A policy update system 1, as illustrated in FIG. 1, includes a user store 10, a cloud server apparatus 20, a policy storage device 30, and a policy update apparatus 40. Incidentally, the policy update apparatus 40, on one hand, and the user store 10, cloud server apparatus 20 and policy storage device 30, on the other hand, are communicable by wire or wirelessly.

The user store 10 further includes a pre-change user store 10A and a post-change user store 10B, as illustrated in FIG. 1.

As illustrated in FIG. 2 to FIG. 6, the pre-change user store 10A is a storage device which stores user-related information before a change. The user-related information is information relating to a user who uses SaaS (Software as a Service) which is provided by the cloud server apparatus 20, and who belongs to an organization in which the policy update apparatus 40 is disposed. Specifically, the user-related information is information such as user attribute information, department information, section information, post information, and SaaS information. Incidentally, the user-related information is not limited to the above-described user attribute information, department information, section information, post information, and SaaS information.

The user attribute information is identity information relating to the user, and is, for example, as illustrated in FIG. 2, information in which a user Id (userId), user name, department Id, section Id, post Id and mail address are associated, that is, a set of pieces of information charactering the information of an individual. The user Id is identification information for identifying the user. The department Id is identification information for identifying a department which is a constituent of the organization in which the policy update apparatus 40 is disposed. The section Id is identification information for identifying a section which is a constituent of the organization in which the policy update apparatus 40 is disposed. The post Id is identification information for identifying the post of a user belonging to the organization in which the policy update apparatus 40 is disposed.

The department information is information relating to a department which is a constituent of the organization in which the policy update apparatus 40 is disposed. For example, as illustrated in FIG. 3, the department information is information in which a department Id, a department name and a deletion flag are associated. The department name designates a name of a department, such as a general affairs department, a business department, a research department or a development department, which is identified by the department Id. The deletion flag indicates whether information including this deletion flag, that is, the department information in this case, is information of a deletion target or not. The deletion flag indicates either "true" or "false". Specifically, if the deletion flag indicates "true", the deletion flag indicates that the information including this deletion flag is information of a deletion target. If the deletion flag indicates "false", the deletion flag indicates that the information including this deletion flag is information of a non-deletion target. In the meantime, even if the deletion flag indicates "true", the information including this deletion flag is not deleted, and the deletion flag is the information which simply indicates whether the information including the deletion flag is a deletion target or not.

The section information is information relating to a section which is a constituent of the organization in which the policy update apparatus 40 is disposed. For example, as illustrated in FIG. 4, the section information is information in which a section Id, a section name and a deletion flag are associated. The section name designates a name of a section, such as a "oo" technical section, a "xx" technical section, or a development support technical section, which is identified by the section Id.

The post information is information relating to a post which exists in the organization in which the policy update apparatus 40 is disposed. For example, as illustrated in FIG. 5, the post information is information in which a post Id, a post name and a deletion flag are associated. The post name designates a name of a post, such as a department manager, a section chief, or a person in charge, which is identified by the post Id.

The SaaS information is information relating to SaaS which can be used by the organization in which the policy update apparatus 40 is disposed. For example, as illustrated in FIG. 6, the SaaS information is information in which a SaaS Id, a SaaS name and an administrator Id are associated. The SaaS Id is identification information for identifying SaaS which is usable by the organization in which the policy update apparatus 40 is disposed, among pieces of SaaS provided by the cloud server apparatus 20. The SaaS name designates a name of SaaS, such as SaaS1 to SaaS3, which can be identified by the SaaS Id. The administrator Id is information indicative of a user Id of a user who manages a user of SaaS identified by the associated SaaS Id in the organization in which the policy update apparatus 40 is disposed.

In the meantime, in the present embodiment, although it is assumed that the pre-change user attribute information is stored in the pre-change user store 10A in the format illustrated in FIG. 2, the format of storage is not limited to this example. For example, it is possible to adopt such a format of storage as to indicate only a change content for each user Id, which indicates different values between pre-change user attribute information and post-change user attribute information, and which includes a value of the pre-change user attribute information and a value of the post-change user attribute information.

The post-change user store 10B is a storage device which stores user-related information that was changed from the user-related information stored in the pre-change user store 10A, as illustrated in FIG. 7 to FIG. 9.

Incidentally, since the post-change user-related information is information having the same format as the pre-change user-related information, a detailed description is omitted here. In addition, in this embodiment, it is assumed that the post information and SaaS information are not changed, and post information and SaaS information after a change are not illustrated. However, it is obvious that, in other modes, post-change post information and SaaS information having the same format as illustrated in FIG. 5 and FIG. 6 may be stored in the post-change user store 10B.

The cloud server apparatus 20 is an apparatus which provides a plurality of pieces of SaaS to a user. The cloud server apparatus 20 includes a plurality of ID storage devices 20A. These ID storage devices 20A are storage devices which store, in association with respective pieces of SaaS that can be provided by the cloud server apparatus 20, ID registration information in which user Id's and user names of users who can use SaaS are associated, for example, as illustrated in FIG. 10 to FIG. 12. In this embodiment, ID storage devices 20A, which correspond to SaaS1 to SaaS3, are provided in the cloud server apparatus 20.

Incidentally, in the present embodiment, a description is given on the assumption that the user Id in the user-related information that is, in the present case, the user attribute information, which is stored in the user store 10, and the user Id in the ID registration information, which is stored in each ID storage device 20A, have the same format. However, the format of the user Id is not limited to this example, and the user Id in the user attribute information and the user Id in the ID registration information may not necessarily have the same format if these are mutually associated.

The policy storage device 30 is a storage device which stores a policy which is composed of at least one condition and stipulates a present use privilege of SaaS provided by the cloud server apparatus 20, for example, as illustrated in FIG. 13. To be more specific, the policy is composed of at least one condition using user-related information, and permits use, that is, permits use of SaaS, if the user-related information that is notified at a time of using SaaS satisfies this condition, and refuses use of SaaS (prohibition-type policy) if permission is not indicated. FIG. 13 illustrates an example of policies relating to three pieces of SaaS, i.e. SaaS1 to SaaS3, which are provided by the cloud server apparatus 20. For example, the policy relating to SaaS1 is a policy which permits use of SaaS if the user-related information satisfies the condition "department Id is dept3, and post Id is post1 or post2", and refuses use of SaaS1 in other cases. Incidentally, the form of description of the policy is not limited to the form of description illustrated in FIG. 13, and may be an arbitrary description form, such as a form of description using various names (department name, section name and post name).

Here, the policy update apparatus 40, as illustrated in FIG. 1, includes a modified policy temporary storage device 41, a deletion user temporary storage device 42, a modified policy creation device 43, a deletion user specifying device 44, a user deletion approval device 45, a policy update device 46, and a user deletion device 47.

The modified policy temporary storage device 41 is a storage device which temporarily stores a plurality of policies including a modified policy which is created by the modified policy creation device 43.

The deletion user temporary storage device 42 is a storage device which temporarily stores deletion-target user information which is generated by the deletion user specifying device, for example, as illustrated in FIG. 14. The deletion-target user information is information in which a user Id and deletion-target SaaS are associated.

The modified policy creation device 43, as illustrated in FIG. 1, further includes a modification-target policy detection unit 43A, a modified policy creation unit 43B, and a modified policy storing unit 43C.

The modification-target policy detection unit 43A detects a policy which requires modification (hereinafter referred to as "modification-target policy"), based on the user-related information stored in each of the pre-change user store 10A and post-change user store 10B and the policies stored in the policy storage device 30. Specifically, the modification-target policy detection unit 43A includes the following functions (f43A-1) to (f43A-4).

(f43A-1) A function of comparing pre-change user-related information and post-change user-related information, which are, in this case, pre-change user attribute information $U_B$ and post-change user attribute information $U_A$, while referring to the user-related information stored in the pre-change user store 10A and post-change user store 10B, and detecting, with respect to each user Id, a content of a difference between the pre-change user attribute information $U_B$ and post-change user attribute information $U_A$, that is, a change content including a pre-change value and a post-change value.

Incidentally, as described above, if the pre-change user attribute information stored in the pre-change user store 10A has the format which indicates only the change content, this function of (f43A-1) is omitted.

(f43A-2) A function of determining, with respect to each change content, whether post-change values included in the change content detected by the function of (f43A-1) are composed of only values (Id) included in the pre-change user-related information that is, in this case, the pre-change department information $D_B$, section information $S_B$ and post information $P_B$, by referring to the user-related information stored in the pre-change user store 10A and post-change user store 10B.

Incidentally, when the function of (f43A-1) is omitted, this function of (f43A-2) becomes a function of detecting, with respect to each change content, whether post-change values in the change content stored in the pre-change user store 10A are composed of only values (Id) included in the pre-change department information $D_B$, section information $S_B$ and post information $P_B$, by referring to the user-related information stored in the pre-change user store 10A and post-change user store 10B.

(f43A-3) A function of assuming, if a determination result by the function of (f43A-2) indicates that the post-change values are composed of only the pre-change user-related information, that the change content does not affect policies, and not detecting, as a modification-target policy, a policy which is satisfied by the pre-change user-related information identified by the user Id associated with the change content, that is, the pre-change user attribute information $U_B$ in this case, by referring to the policies stored in the policy storage device 30.

(f43A-4) A function of assuming, if the determination result by the function of (f43A-2) indicates "No", that the change content affects policies, and detecting, as a modification-target policy, a policy which is satisfied by the pre-change user-related information identified by the user Id associated with the change content, that is, the pre-change user attribute information $U_B$ in this case, by referring to the policies stored in the policy storage device 30.

The modification policy creation unit 43B creates a modified policy in which the user-related information described in the modification-target policy, which was detected by the modification-target policy detection unit 43A, was modified from the pre-change value included in the detected change content to the post-change value.

The modified policy storing unit 43C writes, in the modified policy temporary storage device 41, policies other than the modification-target policy (i.e. policies not detected as the modification-target policy) detected by the modification-target policy detection unit 43A, and the modified policy created by the modified policy creation unit 43B.

Here, an example of the operation of the modified policy creation device with the above-described configuration is described with reference to the schematic views of FIG. 2 to FIG. 9, and FIG. 13, and the flowchart of FIG. 15.

To start with, the modification-target policy detection unit 43A compares the pre-change user attribute information $U_B$ and post-change user attribute information $U_A$, while referring to the user-related information stored in the pre-change user store 10A and post-change user store 10B, and detecting, with respect to each user Id, a change content which indicates values that are different between the pre-change user attribute information $U_B$ and post-change user attribute information $U_A$ (step S1).

Specifically, the modification-target policy detection unit 43A detects, as change contents, "sect1-sect2" of user03, "sect2-sect1" of user06, "dept3, sect3, post2-dept5, sect4, post1" of user08, "dept3, sect3, post3-dept5, sect4, post2" of user09, and "dept3, sect3-dept5, sect4" of user10 (hereinafter expressed as change contents A to E in the named order). Here, the change content is indicated by using a format of "(pre-change value)–(post-change value) of (user ID)".

Subsequently, the modification-target policy detection unit 43A determines, with respect to each of the change contents A to E, whether the post-change values included in the detected change contents A to E are composed of only values (Id) included in the pre-change department information $D_B$, section information $S_B$ and post information $P_B$, by referring to the user-related information stored in the pre-change user store 10A and post-change user store 10B (step S2).

Specifically, the post-change values of the change contents A and B are sect2 and sect1, and, as illustrated in FIG. 4, sect2 and sect1 are included in the pre-change section information $S_B$. Thus, the modification-target policy detection unit 43A determines that the change contents A and B are composed of only the pre-change user-related information (section information $S_B$). In addition, the post-change values of the change contents C to E include dept5 and sect4, and, as illustrated in FIG. 3 and FIG. 4, dept5 and sect4 are not included in the pre-change department information $D_B$ and section information $S_B$. Thus, the modification-target policy detection unit 43A determines that the change contents C to E are not composed of only the pre-change user-related information (department information $D_B$ and section information $S_B$).

If a determination result by the process of step S2 indicates that the post-change values are composed of only the pre-change user-related information (Yes in step S2), the modification-target policy detection unit 43A assumes that the change contents A and B do not affect the policies, and does not detect, as a modification-target policy, the policy $P_1$, $P_2$, which is satisfied by the pre-change user attribute information $U_{B3}$, $U_{B6}$ identified by the user Id "user03", "user06" associated with the change contents A and B, by referring to the policies stored in the policy storage device 30.

If the determination result by the process of step S2 indicates "No" (No in step S2), the modification-target policy detection unit 43A assumes that the change contents C to E affect the policies, and detects, as a modification-target policy, the policy $P_3$ which is satisfied by the pre-change user attribute information $U_{B8}$ to $U_{B10}$ identified by the user Id "user08", "user09", "user10" associated with the change contents C to E, by referring to the policies stored in the policy storage device 30 (step S4).

Next, the modified policy creation unit 43B creates a modified policy in which the user attribute information "dept3" and "sect3" described in the modification-target policy $P_3$, which was detected in the process of step S4, was modified to the post-change values "dept5" and "sect4" included in the change contents C to E (step S5).

Thereafter, the modified policy storing unit 43C writes, in the modified policy temporary storage device 41, the policies $P_1$ and $P_2$ which were not detected as the modification-target policy in the process of step S3, and the modified policy created in the process of step S5 (step S6).

The deletion user specifying device 44, as illustrated in FIG. 1, includes a user attribute information collection unit 44A, a policy evaluation unit 44B, and a deletion user storing unit 44C.

For example, as illustrated in FIG. 16, the user attribute information collection unit 44A collects the post-change user attribute information of the users, who can use SaaS provided by the cloud server apparatus 20, as the information which is necessary for poly evaluation (hereinafter referred to as user attribute information for policy evaluation). Specifically, the user attribute information collection unit 44A includes the following functions (f44A-1) and (f44A-2).

(f44A-1) A function of collecting, while referring to the ID registration information stored in each ID storage device 20A in the cloud server apparatus 20, the post-change user-related information including the user ID in the ID registration information, which is, in this case, the post-change user attribute information $U_A$, as the user attribute information for policy evaluation, from the post-change user store 10B.

(f44A-2) A function of writing the user attributes information for policy evaluation, which was collected by the function of (f44A-1), in a temporary memory (not shown).

The policy evaluation unit 44B evaluates the user attribute information for policy evaluation which was collected by the user attribute information collection unit 44A, based on the policies and modified policy stored in the modified policy temporary storage device 41.

Specifically, the policy evaluation unit 44B includes the following functions (f44B-1) and (f44B-2).

(f44B-1) A function of evaluating, based on the policies and modified policy stored in the modified policy temporary storage device 41, the user attribute information for policy evaluation which was collected by the user attribute information collection unit 44A, that is, evaluating whether the user attribute information for policy evaluation satisfies the policies and modified policy.

(f44B-2) A function of generating evaluation result information indicative of the evaluation result by the function of (f44B-1), and then writing the generated evaluation result information in a temporary memory (not shown).

In the meantime, for example, as illustrated in FIG. 17, the evaluation result information is information in which the user ID, user name and SaaS use privilege are associated. The SaaS use privilege corresponds to SaaS which the cloud server apparatus 20 can provide to the organization in which the policy update apparatus 40 is disposed. In this case, the evaluation result information indicates evaluation results relating to use privileges of SaaS1 to SaaS3. Specifically, as illustrated in FIG. 17, the SaaS use privilege is expressed by any one of values of "permission", "refusal" and "–". The "permission" indicates an evaluation result to the effect that the user attribute information for policy evaluation satisfies the policy and/or modified policy relating to the SaaS. The "refusal" indicates an evaluation result to the effect that the pre-change user attribute information $U_B$ satisfies the policy relating to the SaaS, but the user attribute information for policy evaluation does not satisfy the policy and/or modified policy relating to the SaaS. The sign "–" indicates an evaluation result to the effect that both the pre-change user attribute information $U_B$ and the user attribute information for policy evaluation fail to satisfy the policy and/or modified policy relating to the SaaS.

The deletion user storing unit 44C generates deletion-target user information, based on the evaluation result information generated by the policy evaluation unit 44B, and then writes the generated deletion-target user information in the deletion user temporary storage device 42.

In the meantime, the deletion-target user information is information in which the user ID and deletion-target SaaS are associated, for example, as illustrated in FIG. 14. The deletion-target SaaS corresponds to SaaS which the cloud server apparatus 20 can provide to the organization in which the policy update apparatus 40 is disposed. In this case, the deletion-target SaaS relates to the ID registration information stored in the respective ID storage devices 20A corresponding to SaaS1 to SaaS3. Specifically, as illustrated in FIG. 14, the deletion-target SaaS is expressed by using any one of values of "○", "×" and "–". The sign "○" corresponds to "refusal" of the SaaS use privilege in the evaluation result information which was generated by the policy evaluation unit 44B, and indicates that the ID registration information, which is stored in the ID storage device 20A corresponding to the SaaS and includes the user ID associated with the deletion-target SaaS, is a deletion target. The sign "×" corresponds to "permission" of the SaaS use privilege in the evaluation result information which was generated by the policy evaluation unit 44B, and indicates that the ID registration information, which is stored in the ID storage device 20A corresponding to the SaaS and includes the user ID associated with the deletion-target SaaS, is a non-deletion target. The sign "–" corresponds to "–" of the SaaS use privilege in the evaluation result information which was generated by the policy evaluation unit 44B, and indicates that the ID registration information, which includes the user ID associated with the deletion-target SaaS, is not stored in the ID storage device 20A corresponding to the SaaS.

Here, an example of the operation of the deletion user specifying device with the above-described configuration is described with reference to the schematic views of FIG. 7, FIG. 10 to FIG. 12, FIG. 14 and FIG. 17, and the flowchart of FIG. 18. In this example of the operation, however, it is assumed that the above-described process of steps S1 to S6 was executed by the modified policy creation device 43, and the policies $P_1$ and $P_2$, and the modified policy, which corresponds to the policy $P_3$, are stored in the modified policy temporary storage device 41.

Following the process of step S6, the user attribute information collection unit 44A collects, while referring to the ID registration information, $R_1$ to $R_3$, which is stored in the ID storage devices 20A in the cloud server apparatus 20, the post-change user-related information including the user ID in the ID registration information, $R_1$ to $R_3$, which is, in this case, the post-change user attribute information, $U_{A1}$ to $U_{A3}$, and $U_{A8}$ to $U_{A10}$, as user attribute information M for policy evaluation, from the post-change user store 10B (step S7).

Next, the policy evaluation unit 44B evaluates the user attribute information M for policy evaluation which was collected in the process of step S7, based on the policies $P_1$, $P_2$ and the modified policy stored in the modified policy temporary storage device 41. Specifically, the policy evaluation unit 44B evaluates whether the user attribute information M for policy evaluation satisfies the policies $P_1$, $P_2$ and modified policy (step S8).

Subsequently, as illustrated in FIG. 17, the policy evaluation unit 44B generates evaluation result information N indicative of the evaluation result by the process of step S8 (step S9).

Thereafter, the deletion user storing unit 44C generates deletion-target user information T as illustrated in FIG. 14, based on the evaluation result information N generated by the process of step S9, and then writes the generated deletion-target user information T in the deletion user temporary storage device 42 (step S10).

The user deletion approval device 45, as illustrated in FIG. 1, includes an approval request unit 45A, a deletion-target user deletion unit 45B, and a modified-policy modification unit 45C.

In connection with the SaaS indicative of the value to the effect that the deletion-target SaaS in the deletion-target user information stored in the deletion user temporary storage device 42 is the deletion target, the approval request unit 45A requests approval/rejection relating to the deletion of the ID registration information, which includes the user ID associated with the deletion-target SaaS, from the ID storage device 20A corresponding to the SaaS. The approval/rejection is requested of the user (an administrator terminal of the user) identified by the pre-change user-related information, that is, in this case, the administrator ID in the SaaS information relating to the SaaS, which is stored in the pre-change user store 10A.

In the meantime, upon receiving the request from the approval request unit 45A, the administrator terminal transmits, in accordance with an operation of the user (administrator), a response message, which includes a message to the effect that the request is approved or refused, and the user ID, to the user deletion approval device 45.

Upon accepting an input of the response message including a message indicative of rejection, which was transmitted from the administrator terminal, the deletion-target user deletion unit 45B deletes, from the deletion user temporary storage device 42, the deletion-target user information including the user ID in the response message the input of which was accepted.

In order that the user, who is identified by the user ID in the response message the input of which was accepted by the deletion-target user deletion unit 45B, can continuously use the SaaS indicative of the value to the effect that the deletion-target SaaS associated with the user ID in the deletion-target user information is the deletion target, the modified-policy modification unit 45C creates a modified policy in which the policy relating to this SaaS was modified, and updates (rewrites) the policy relating to this SaaS, which is stored in the modified policy temporary storage device 41, to this created modified policy.

Here, an example of the operation of the deletion user deletion approval device with the above-described configuration is described with reference to the schematic views of FIG. 6, FIG. 10 to FIG. 12, and FIG. 20, and the flowchart of FIG. 19. In this example of the operation, however, it is assumed that the above-described process of steps S1 to S6 was executed by the modified policy creation device 43, and the policies $P_1$ and $P_2$, and the modified policy, which corresponds to the policy $P_3$, are stored in the modified policy temporary storage device 41. In addition, it is assumed that the above-described process of steps S7 to S10 was executed by the deletion user specifying device 44, and the deletion-target user information illustrated in FIG. 14 is stored in the deletion user temporary storage device 42.

Following the process of step S10, in connection with SaaS1 and SaaS2 indicative of the value to the effect that the deletion-target SaaS in the deletion-target user information T stored in the deletion user temporary storage device 42 is the deletion target, the approval request unit 45A requests approval/rejection relating to the deletion of the ID registration information $R1_3$, $R2_2$, which includes the user ID "user08", "user03" associated with the deletion-target SaaS, from the ID storage devices 20A corresponding to the SaaS1 and SaaS2. The approval/rejection is requested of the user (the administrator terminal of the user) identified by the administrator ID "user01", "user02" in the SaaS information $Sa_1$, $Sa_2$ relating to the SaaS1, SaaS2, which is stored in the pre-change user store 10A (step S11).

In this case, responding to the request from the approval request unit 45A, the administrator terminal transmits, as response messages, a message to the effect that the deletion of the ID registration information $R1_3$ including user ID "user08" is rejected, and a message to the effect that the deletion of the ID registration information $R2_2$ including user ID "user03" is approved, to the deletion-target user deletion unit 45B.

Next, upon accepting an input of the response messages transmitted from the administrator terminal, the deletion-target user deletion unit 45B executes a process according to the messages in the response messages the input of which was accepted (step S12).

In this case, in connection with the response message including the message to the effect that the deletion of the ID registration information $R1_3$ including user ID "user08" is rejected, the deletion-target user deletion unit 45B deletes, from the deletion user temporary storage device 42, the deletion-target user information including the user ID "user08".

In addition, in connection with the response message including the message to the effect that the deletion of the ID registration information $R2_2$ including user ID "user03" is approved, the deletion-target user deletion unit 45B transmits a deletion request message, which requests deletion of the ID registration information $R2_2$, to the user deletion device 47 (to be described later). Then, the user deletion device 47 executes deletion of the ID registration information $R2_2$.

Thereafter, in order that the user, who is identified by the user ID "user08" in the response message the input of which was accepted by the deletion-target user deletion unit 45B, can continuously use the SaaS1 indicative of the value to the effect that the deletion-target SaaS associated with the user ID in the deletion-target user information is the deletion target, the modified-policy modification unit 45C creates a modified policy in which the policy $P_1$ relating to the SaaS1 was modified, and updates the policy $P_1$ relating to the SaaS1, which is stored in the modified policy temporary storage device 41, to this created modified policy (step S13).

Specifically, as illustrated in FIG. 20, the modified-policy modification unit 45C refers to the post-change user-related information including user ID "user08", which is, in this case, the user attribute information $U_{A8}$, and adds a condition "department Id is dept5, and post Id is post1" using the department Id and post Id included in the user attribute information $U_{A8}$. Here, since the policy P1 is composed of the condition using the department Id and post Id in the user attribute information, the condition using the department Id and post Id is added. Specifically, the condition is added so as to correspond to the user attribute information which was used in the condition constituting the corresponding policy. The policy update device 46 updates the policies stored in the policy storage device 30, in accordance with the policies and the modified policies stored in the modified policy temporary storage device 41.

Upon receiving the deletion request message that was transmitted from the user deletion approval device 45, the user deletion device 47 deletes the ID registration information stored in the ID storage device 20A in the cloud server apparatus 20, in accordance with the deletion request message the input of which was accepted.

According to the above-described embodiment, a policy update work and a system environment update work can be realized in a nonmanual manner.

The method that has been described in connection with each of the above embodiments may be stored as a computer-executable program in a storage medium such as a magnetic disk (e.g. a floppy (trademark) disk, a hard disk), an optical disk (e.g. a CD-ROM, a DVD), a magneto-optic disc (MO), or a semiconductor memory, and may be distributed.

Additionally, the storage form of this storage medium may be any form as long as the storage medium can store programs and is readable by a computer.

Additionally, an OS (operating system) running on a computer based on an instruction of a program installed from the storage medium into the computer, or MW (middleware), such as database management software or network software, may execute a part of each of processes for realizing the above embodiments.

Additionally, the storage medium in each embodiment is not limited to a medium which is independent from the computer, and includes a storage medium which stores or temporarily stores, by download, a program which is transmitted over a LAN or the Internet.

Additionally, the number of storage media is not limited to one. The configuration of the storage media in the invention includes such a case that the process in each of the above-described embodiments is executed from a plurality of media, and the configuration of the media may be any configuration.

Incidentally, the computer in each embodiment is a computer which executes each process in each embodiment, based on a program stored in the storage medium. The computer may have any configuration, for example, a configuration as a single apparatus such as a personal computer, or a configuration as a system in which a plurality of apparatuses are connected over a network.

Additionally, the computer in each embodiment is not limited to a personal computer, and is a general concept of equipment and apparatuses including an arithmetic processing apparatus included in information processing equipment, a microcomputer, etc., which can realize the functions of the invention by programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A policy update system comprising:
   a server apparatus configured to be able to provide a plurality of services to a user, the server apparatus including storage device for storing, with respect to each of the services, at least a first user ID which identifies a user who can use the services;
   a policy storage device configured to store a plurality of policies, each policy being composed of at least one condition describing user attribute information which is identity information relating to the user and in which a plurality of items including at least a second user ID corresponding to the first user ID are associated, and each policy specifying a use privilege of each service, which permits use of the services when a value of the user attribute information satisfies the condition;
   a policy update processing apparatus configured to be able to update each stored policy when the user attribute information was changed; and
   a user attribute information storage device configured to store post-change user attribute information, and a change content for each second user ID, the change content indicating values which are different between pre-change user attribute information and the post-change user attribute information, and including a value of the pre-change user attribute information and a value of the post-change user attribute information,
   the policy update processing apparatus comprising:
     detection circuitry configured to detect a modification-target policy which requires modification and the policies excluding the modification-target policy, among the policies stored in the policy storage device, based on the change content stored in the user attribute information storage device;
     creation circuitry configured to create a modified policy in which the value of the user attribute information, which is described in the detected modification-target policy, was modified from the value of the pre-change user attribute information in the stored change content to the value of the post-change user attribute information;
     collection circuitry configured to collect the post-change user attribute information including the second user ID of the user, who can use the services provided by the server apparatus, as user attribute information for policy evaluation, from the user attribute information storage device;
     evaluation circuitry configured to evaluate whether the collected user attribute information for policy evaluation satisfies the policies excluding the modification-target policy and the modified policy with respect to each second user ID, based on the policies excluding the modification-target policy, among the policies stored in the policy storage device, and the created modified policy;
     specifying circuitry configured to specify the second user ID which is indicative of, among evaluation results by the evaluation circuitry, an evaluation result to an effect that the policy is satisfied by the pre-change user attribute information in the change content stored in the user attribute information storage device but the policy and/or modified policy is not satisfied by the value of the collected user attribute information for policy evaluation;
     update circuitry configured to for updating the policy corresponding to the created modified policy, among the policies stored in the policy storage device, to the modified policy; and
     deletion circuitry configured to delete the first user ID, which corresponds to the specified second user ID, from the storage device in the server apparatus.

2. The policy update system of claim 1, wherein the policy update processing apparatus further comprises:

request circuitry configured to request, in connection with deletion of the first user ID corresponding to the specified second user ID, approval of the deletion of the first user ID from an administrator terminal which is operated by an administrator who manages the services provided by the server apparatus; and deletion execution circuitry configured to execute the deletion of the first user ID in accordance with a response from the administrator terminal in connection with the approval of the deletion requested by the request circuitry.

3. A policy update apparatus which is connectable to a server apparatus that is configured to be able to provide a plurality of services to a user, the server apparatus including storage device configured to store, with respect to each of the services, at least a first user ID which identifies a user who can use the services; a policy storage device configured to store a plurality of policies, each policy being composed of at least one condition describing user attribute information which is identity information relating to the user and in which a plurality of items including at least a second user ID corresponding to the first user ID are associated, and each policy specifying a use privilege of each service, which permits use of the services when a value of the user attribute information satisfies the condition; and a user attribute information storage device configured to store, when the user attribute information is changed, post-change user attribute information, and a change content for each second user ID, the change content indicating values which are different between pre-change user attribute information and the post-change user attribute information, and including a value of the pre-change user attribute information and a value of the post-change user attribute information, the policy update apparatus comprising:

detection circuitry configured to detect a modification-target policy which requires modification and the policies excluding the modification-target policy, among the policies stored in the policy storage device, based on the change content stored in the user attribute information storage device;

creation circuitry configured to create a modified policy in which the value of the user attribute information, which is described in the detected modification-target policy, was modified from the value of the pre-change user attribute information in the stored change content to the value of the post-change user attribute information;

collection circuitry configured to collect the post-change user attribute information including the second user ID of the user, who can use the services provided by the server apparatus, as user attribute information for policy evaluation, from the user attribute information storage device;

evaluation circuitry configured to evaluate whether the collected user attribute information for policy evaluation satisfies the policies excluding the modification-target policy and the modified policy with respect to each second user ID, based on the policies excluding the modification-target policy, among the policies stored in the policy storage device, and the created modified policy;

specifying circuitry configured to specify the second user ID which is indicative of, among evaluation results by the evaluation circuitry, an evaluation result to an effect that the policy is satisfied by the pre-change user attribute information in the change content stored in the user attribute information storage device but the policy and/or modified policy is not satisfied by the value of the collected user attribute information for policy evaluation;

update circuitry configured to update the policy corresponding to the created modified policy, among the policies stored in the policy storage device, to the modified policy; and deletion circuitry configured to delete the first user ID, which corresponds to the specified second user ID, from the storage device in the server apparatus.

4. The policy update apparatus of claim 3, further comprising:

request circuitry configured to request, in connection with deletion of the first user ID corresponding to the specified second user ID, approval of the deletion of the first user ID from an administrator terminal which is operated by an administrator who manages the services provided by the server apparatus; and deletion execution circuitry configured to execute the deletion of the first user ID in accordance with a response from the administrator terminal in connection with the approval of the deletion requested by the request circuitry.

5. The policy update system according to claim 1, wherein the evaluation circuitry generates evaluation results including: a first evaluation result indicating that the user attribute information for policy evaluation satisfies the policies excluding the modification-target policy and/or the modified policy; a second evaluation result indicating that the pre-change user attribute information in the change content stored in the user attribute information storage device satisfies the policies excluding the modification-target policy and/or the modified policy, but that the user attribute information for policy evaluation does not satisfy the policies excluding the modification-target policy and/or the modified policy; and a third evaluation result indicating that both the pre-change user attribute information and the user attribute information for policy evaluation fail to satisfy the policies excluding the modification-target policy and/or the modified policy.

6. The policy update apparatus according to claim 3, wherein the evaluation circuitry generates evaluation results including: a first evaluation result indicating that the user attribute information for policy evaluation satisfies the policies excluding the modification-target policy and/or the modified policy; a second evaluation result indicating that the pre-change user attribute information in the change content stored in the user attribute information storage device satisfies the policies excluding the modification-target policy and/or the modified policy, but that the user attribute information for policy evaluation does not satisfy the policies excluding the modification-target policy and/or the modified policy; and a third evaluation result indicating that both the pre-change user attribute information and the user attribute information for policy evaluation fail to satisfy the policies excluding the modification-target policy and/or the modified policy.

* * * * *